(12) United States Patent
Maloney et al.

(10) Patent No.: US 7,700,874 B2
(45) Date of Patent: Apr. 20, 2010

(54) CABLE MOUNTING STRUCTURE AND SNAP FIT DOOR HINGE FOR TELECOMMUNICATIONS DISTRIBUTION PEDESTAL

(75) Inventors: Jerome A. Maloney, Sugar Grove, IL (US); Eduardo Leon, Woodridge, IL (US); Simon Shen-Meng Chen, Palatine, IL (US); George I. Wakileh, Batavia, IL (US)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 433 days.

(21) Appl. No.: 11/895,344

(22) Filed: Aug. 24, 2007

(65) Prior Publication Data
US 2009/0050363 A1 Feb. 26, 2009

(51) Int. Cl.
*H02G 9/00* (2006.01)
(52) U.S. Cl. .............................. 174/38; 174/37; 174/39; 52/3; 631/664
(58) Field of Classification Search ................... 174/37, 174/38, 39, 17 R, 17 CT, 58, 60; 138/11, 138/112, 115; 312/263, 223.6, 265.5; 220/3.3, 220/3.8; 631/664; 52/3; 340/618, 623, 624
See application file for complete search history.

(56) References Cited

U.S. PATENT DOCUMENTS

| | | | |
|---|---|---|---|
| 3,268,158 A * | 8/1966 | Abbott | 232/1 R |
| 3,872,234 A | 3/1975 | Smith | |
| 4,631,353 A * | 12/1986 | Marks | 174/16.1 |
| 5,696,493 A * | 12/1997 | Einck | 340/623 |
| D420,674 S | 2/2000 | Powell | |
| D430,849 S | 9/2000 | Leschinger et al. | |
| 6,198,041 B1 | 3/2001 | Leschinger et al. | |
| 6,455,772 B1 | 9/2002 | Leschinger et al. | |
| 6,462,269 B1 | 10/2002 | Leschinger et al. | |
| 6,598,949 B2 | 7/2003 | Frazier et al. | |
| 7,038,127 B2 | 5/2006 | Harwood | |
| 7,357,009 B2 | 4/2008 | Maloney et al. | |
| 2002/0092127 A1 | 7/2002 | Nhep | |
| 2006/0193588 A1 | 8/2006 | Mertesdorf et al. | |
| 2007/0183732 A1 | 8/2007 | Wittmeier et al. | |
| 2008/0253105 A1 | 10/2008 | Maloney et al. | |
| 2008/0258020 A1 | 10/2008 | Chen et al. | |
| 2009/0050364 A1 | 2/2009 | Maloney et al. | |

OTHER PUBLICATIONS

Charles Fiber Distribution Point (CFDP); Closed Architecture Fiber Pedestals Feature A Weather-Tight "Enclosure Within An Enclosure" Design for Superior Environmental Protection; 4 pages.

(Continued)

*Primary Examiner*—Dhiru R Patel
(74) *Attorney, Agent, or Firm*—Harness, Dickey & Pierce, P.L.C.

(57) ABSTRACT

A cable mounting structure for a telecommunications cable distribution pedestal is provided. The structure has back to back compartments, may be used with fiber or wire and includes at least one door. The structure also includes protection and organization features. The structure is field convertible, reconfigurable and upgradeable. A snap fit door hinge for a telecommunications cable distribution pedestal is also provided.

10 Claims, 14 Drawing Sheets

OTHER PUBLICATIONS

Pedlock BDO-ET Series Fiber Pedestals; Buried Distribution Pedestals Designed to House and Protect Sealed Fiber Terminal Blocks; 4 pages.
AFL Telecommunications; Fiber Apparatus; 3 pages.
Emerson Network Power; NetSpan Integrated Fiber Distribution Terminal Solutions; 4 pages.
Tyco Electronics; FIBRBox Splice Enclosures; 1 page.
Pedlock BDO Series Fiber Pedestals; Buried Distribution Pedestal Designed for Superior OSP Protection of Fiber Optic Splice and Storage Points; 2 pages.
Charles Fiber Distribution Point (CFDP); Closed Architecture Fiber Pedestals Feature A Weather-Tight "Enclosure Within An Enclosure" Design for Superior Environmental Protection; [retrieved Sep. 19, 2006]; 4 pages.
Pedlock BDO-ET Series Fiber Pedestals; Buried Distribution Pedestals Designed To House And Protect Sealed Fiber Terminal Blocks; [retrieved Sep. 26, 2006]; 4 pages.
AFL Telecommunications; Fiber Apparatus; May 04, 2007; 3 pages.
Emerson Network Power; NetSpan Integrated Fiber Distribution Terminal Solutions; Jan. 2007; 4 pages.
Tyco Electronics; FIBRBox Splice Enclosures; Jul. 24, 2007; 1 page.
Pedlock BDO Series Fiber Pedestals; Buried Distribution Pedestal Designed for Superior OSP Protection Of Fiber Optic Splice and Storage Points; Jul. 24, 2007; 2 pages.

* cited by examiner

CABLE MOUNTING STRUCTURE AND SNAP FIT DOOR HINGE FOR TELECOMMUNICATIONS DISTRIBUTION PEDESTAL

FIELD

The present disclosure relates to telecommunications distribution pedestals for copper and/or fiber optic cable.

BACKGROUND

The statements in this section merely provide background information related to the present disclosure and may not constitute prior art.

Telecommunications pedestals are commonly used by the telecommunication industry to house and protect connections and splices of copper wire or fiber optic cable. The Applicants have recognized that existing telecommunications pedestals are often unsatisfactory and have limitations that may be overcome.

SUMMARY

According to one aspect of the present disclosure, a hinge for a telecommunications cable distribution pedestal is disclosed. The hinge includes a flex finger. The hinge is configured such that the hinge will travel a first portion and a third portion without interference by the flex finger. The flex finger provides resistance to the hinge travel during a second portion.

According to another aspect of the present disclosure, a cable mounting structure for a telecommunications cable distribution pedestal includes multiple back-to-back compartments and at least one door. The compartments each have a substantially rectangular configuration. The door is operable to open and close and covers less than all of one of the multiple back-to-back compartments when the door is closed.

According to a further aspect of this disclosure, a cable mounting structure for a telecommunications cable distribution pedestal is disclosed. The cable mounting structure has a first compartment, a second compartment and at least one door. The first compartment and the second compartment are back-to-back compartments. The first compartment includes copper distribution components and the second compartment includes fiber distribution components. The at least one door is operable to open and close and covers less than all of the second compartment when closed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
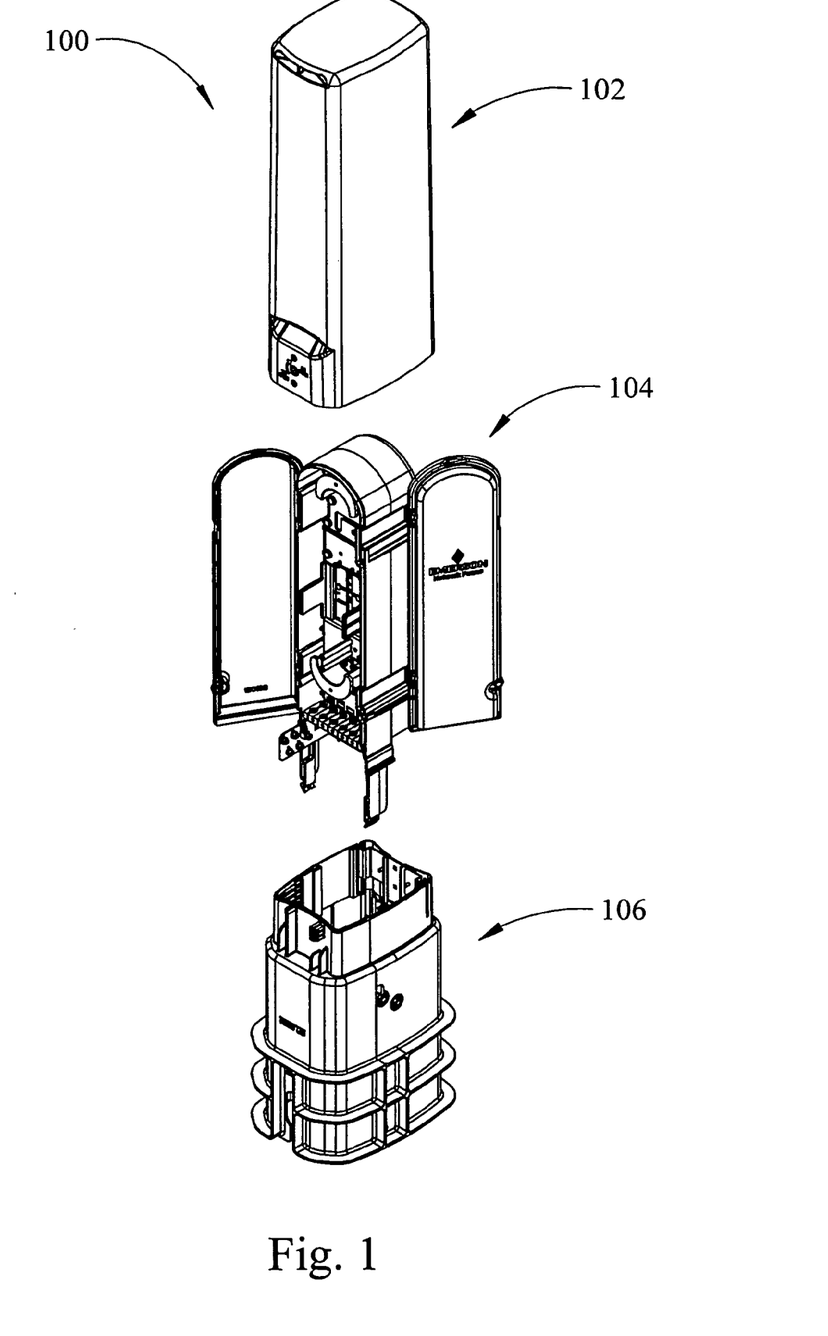
FIG. 1 is an exploded view of a telecommunications cable distribution pedestal.

With reference to FIG. 1, a telecommunications cable distribution pedestal, generally indicated by the reference numeral 100, consists of a dome 102, a cable mounting structure 104, and a base 106. The dome, the base, and the cable mounting structure have a substantially rectangular configuration. Alternatively, the dome, base and cable mounting structure may have a different shape. The dome is sized to fit over the cable mounting structure with the interior of the dome in close proximity to the cable mounting structure. The dome also fits over and is supported by a portion of the base as is illustrates in FIG. 1. The dome thus provides cover, protection and weather proofing for the cable mounting structure and items mounted upon the cable mounting structure. This combination provides physical and weather protection for the cable, wire, connections and other elements contained on or within the cable mounting structure. Sometimes additional protection is desired. This can be achieved by surrounding a compartment of the cable mounting structure with a peripheral flange that covers the components in the compartment and/or a door that closes over a compartment. These and other embodiments will be discussed more fully below.

Figure 2A:
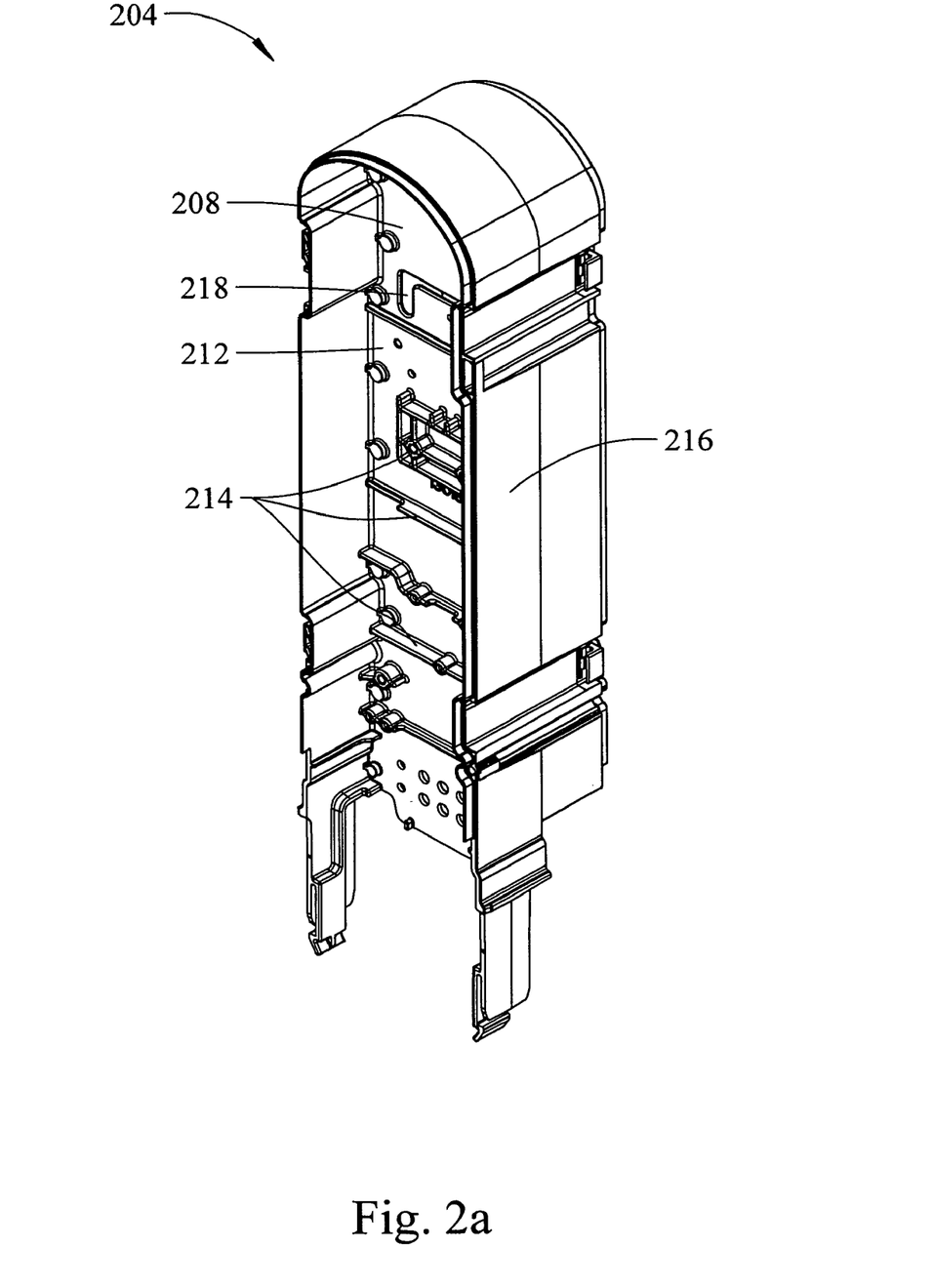
FIG. 2*a* is an isometric view of one side of a cable mounting structure for a telecommunications cable distribution pedestal.
Figure 2B:
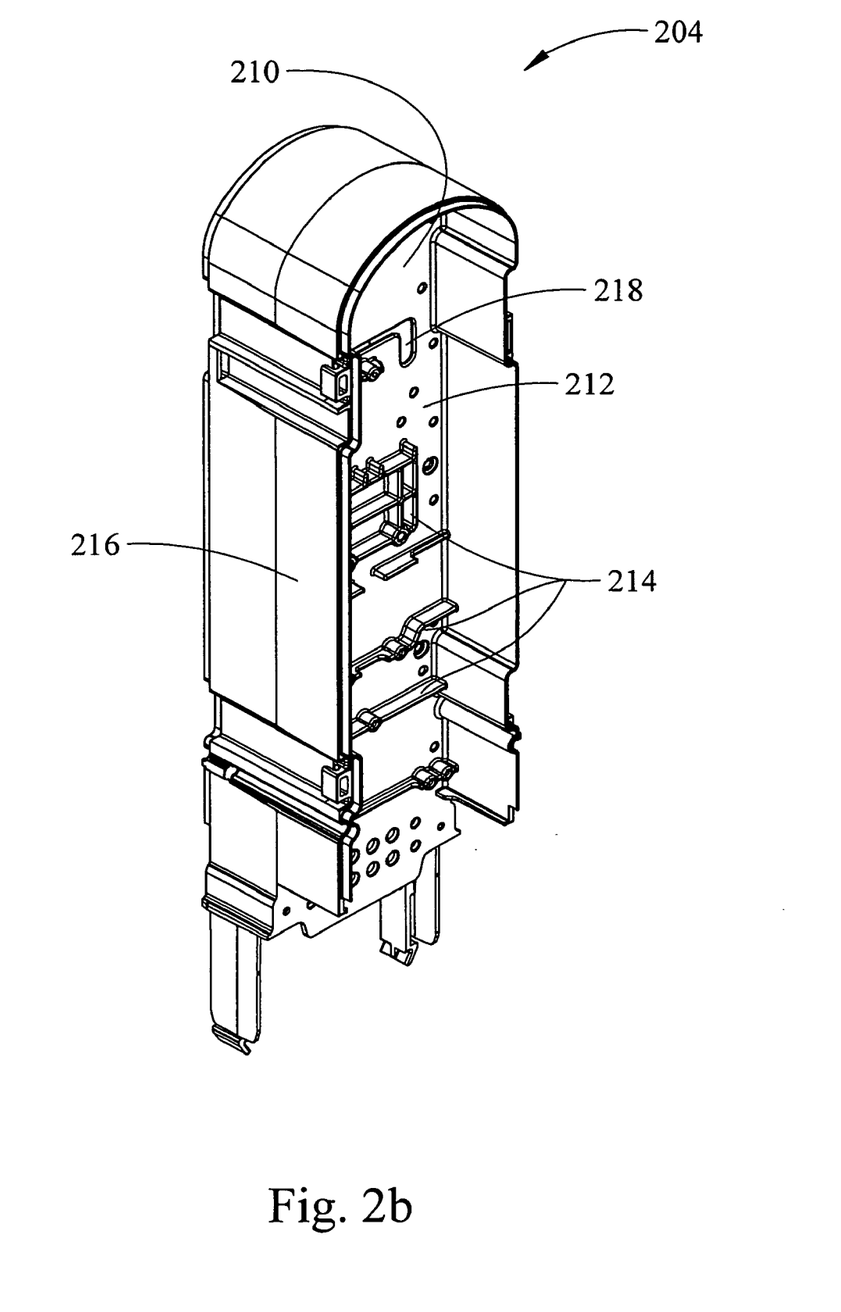
FIG. 2*b* is an isometric view of the other side of a cable mounting structure for a telecommunications cable distribution pedestal.

FIGS. 2*a* and 2*b* illustrate the cable mounting structure 204 according to one embodiment of this disclosure. The cable mounting structure has multiple back-to-back compartments. The cable mounting structure has a first compartment 208, shown in FIG. 2*a*, and a second compartment 210, shown in FIG. 2*b*.

As shown in FIGS. 2*a* and 2*b*, the cable mounting structure includes a mounting plate 212 and the mounting plate includes a plurality of fastener standoffs 214. The fastener standoffs are used for attaching the distribution components to one side of the mounting plate without the attachment mechanically interfering with distribution component on the second side of the mounting plate. The standoff raises the distribution component above the surface of the mounting plate to create a clearance so that screws or bolts can be used to attach items to the other side of the plate. Distribution components may, therefore, be mounted in the same horizontal and vertical position on the mounting plate on each side of the mounting plate. Because of the standoffs, there is no need to adjust the position of components on one side of the mounting plate to avoid interfering with mounting locations for components on the second side of the mounting plate. Although FIGS. 2a and 2b illustrate a plurality of fastener standoffs, the cable mounting structure may have more or less, or even no, fastener standoffs. The fastener standoffs may also be separate parts attached to the mounting plate or a unitary part of the mounting plate. The standoffs may be molded into the mounting plate as part of the mounting plate when the mounting plate is formed.

This mounting plate is a universal mounting plate adapted to support a plurality of distribution components in different numbers and combinations. The distribution components may be for copper wire or fiber optic cable. The distribution components are available from a number of different manufacturers and in a variety of configurations. The mounting plate is adapted to mount the components from any manufacturer in any combination. Copper wire and fiber optic cable distribution components may be mixed in the cable mounting structure, either in the same compartment or copper in one compartment and fiber optic cable in the other compartment. The distribution components may include, without limitation, cable management guides, ground wire posts, strength member clamps, splice trays, splice tray support brackets, radius limiting spools, support plates for non-hardened connections, hardened connector blocks, copper blocks, hardened and non-hardened pre-connectorized fiber cable connections.

The cable mounting structure also has a peripheral flange 216. The flange extends outward from the back of each compartment at least as far as any distribution components mounted on the mounting plate. This flange aids in protecting the cable, wire and distribution components. The peripheral flange is molded as a unitary part of the cable mounting structure. Alternatively, the peripheral flange may be a removably attached flange or may be a unitary part of the mounting plate.

The mounting plate also includes at least one through hole 216 for routing cable between the first compartment and the second compartment. This through hole allows cable to be routed through the mounting plate rather than around, under or over the mounting plate. Therefore, it decreases the amount of cable used and aids in the organization within the cable mounting structure.

Figure 3A:
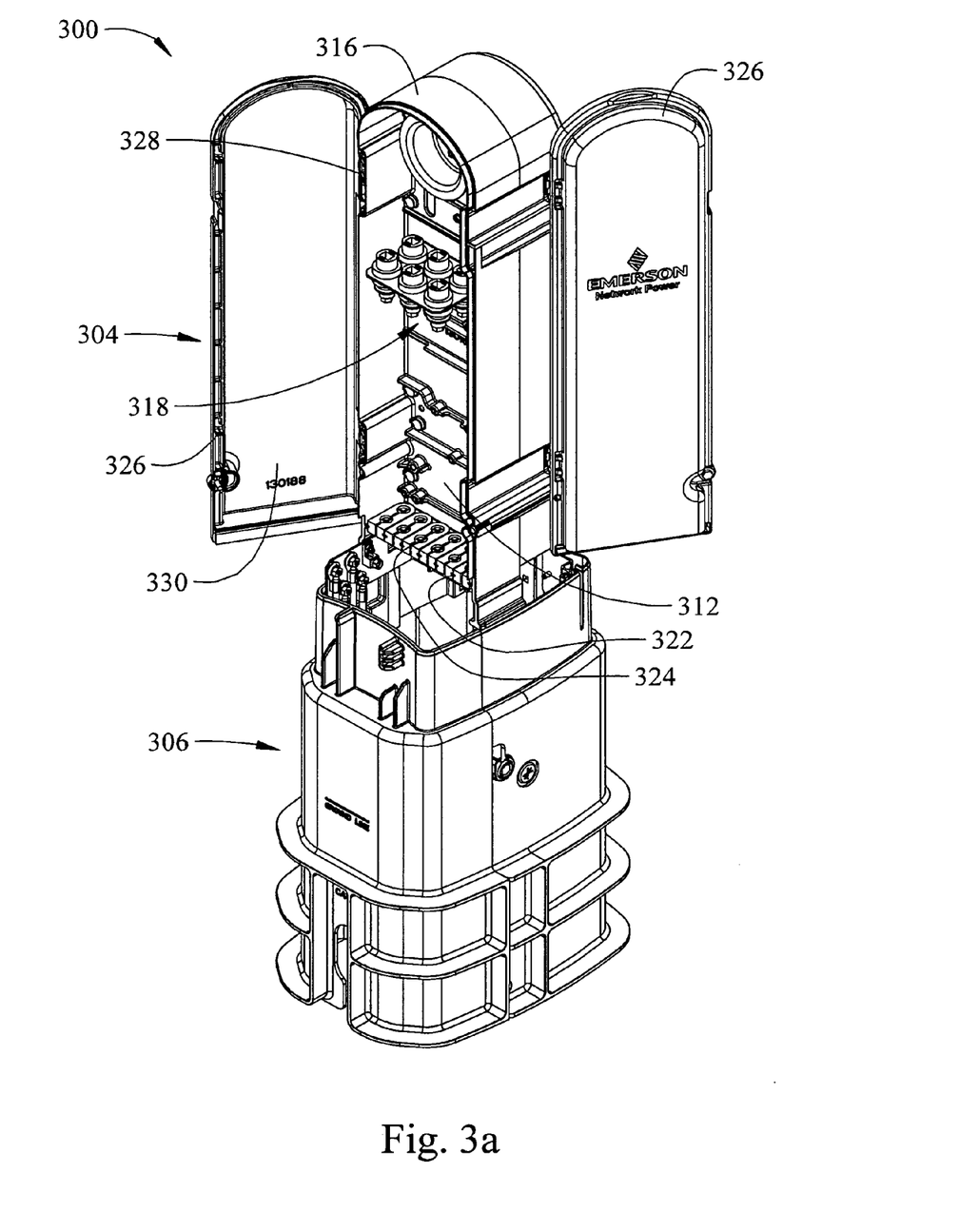
FIG. 3*a* is an isometric view of a cable mounting structure for a telecommunications cable distribution pedestal mounted on a base.
Figure 3B:
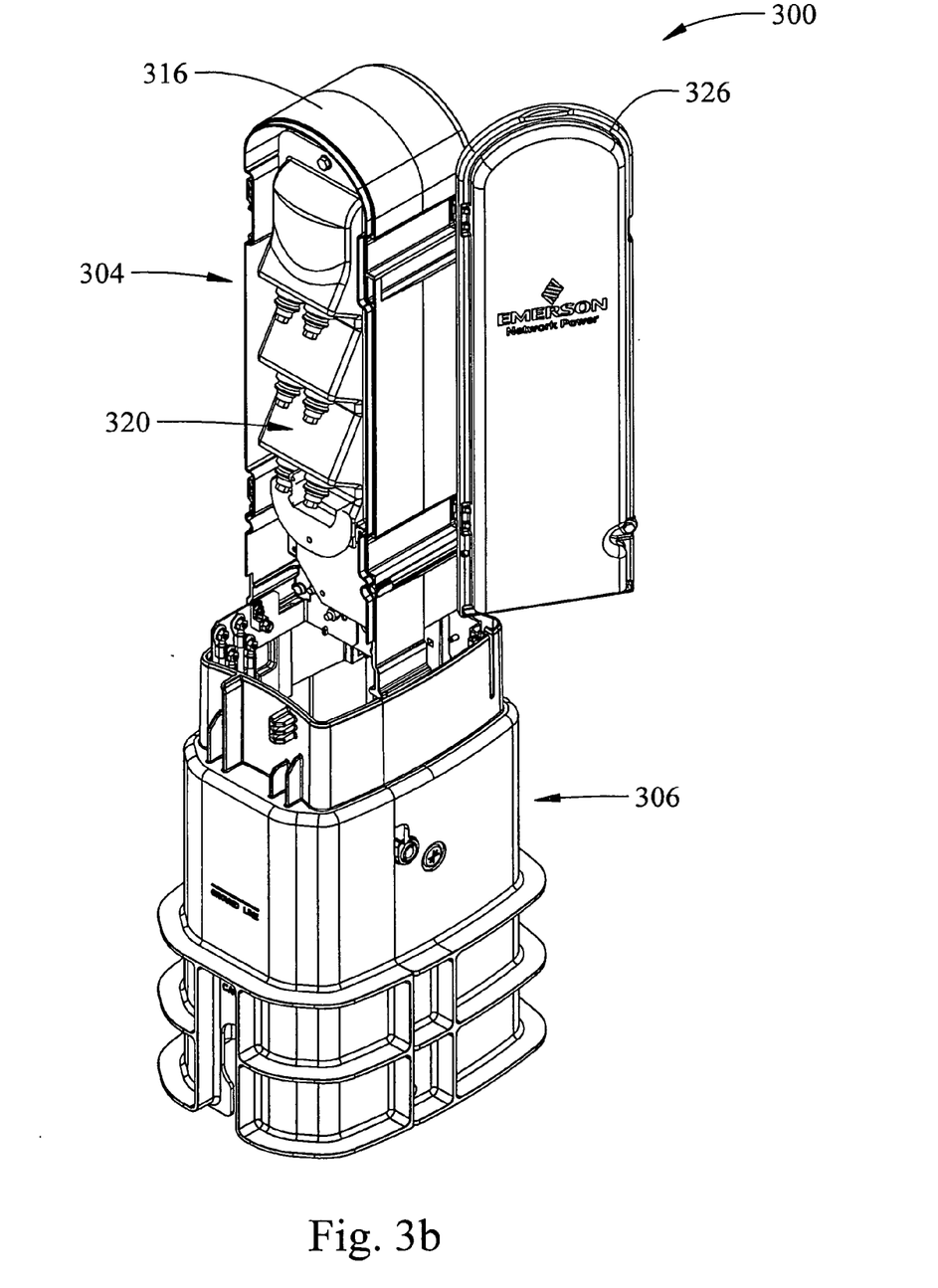
FIG. 3*b* is an isometric view of a cable mounting structure for a telecommunications cable distribution pedestal mounted on a base.

FIGS. 3a and 3b show a telecommunications cable distribution pedestal 300, according to another embodiment. The telecommunications cable distribution pedestal consists of a dome (not shown), a cable mounting structure 304, and a base 306. FIGS. 3a and 3b illustrate the cable mounting structure including hardened fiber cable connectors 318 mounted in a first compartment while a second compartment of the cable mounting structure contains a second type of hardened fiber cable connectors known as hardened fiber blocks 320. Hardened fiber cable connections are available in a variety of numbers and configurations. Non-hardened fiber cable connections (not shown) and some hardened fiber cable connections are not weather tight and benefit from additional protection from the elements. Some features for providing such additional protection will be discussed below. The hardened fiber blocks are weather tight connectors for fiber optic cable connection, available in multiple numbers and configurations and are manufactured by several different manufacturers. The weather tight nature of the hardened connections, allows them to be used without additional protection from the elements. Although FIGS. 3a and 3b illustrate hardened connections, hardened and non-hardened connections can be used together and in numerous combinations in the same compartment or in separate compartments. Additionally, these connections may be used in numerous combinations with any additional distribution components.

Additional protection for the distribution components is provided by a number of features of the telecommunications cable distribution pedestal. The dome provides a first level of protection for the distribution components. The cable mounting structure shown in FIGS. 3a and 3b also has a peripheral flange 316. As discussed above, the peripheral flange surrounds at least three sides of a compartment and extends in an approximately perpendicular direction away from the mounting plate 312 at least as far as the distribution components mounted on the mounting plate. Thus, even when the dome is removed, or if the dome leaks, the distribution components, such as the hardened connections 318 and 320, are completely protected by the peripheral flange above and along the sides. Protection for the remaining side, i.e. the bottom, may be obtained by adding a removable bottom plate 322. When the bottom plate is attached, the flange and the bottom plate form a complete perimeter of protection around the compartment. The bottom plate also has grommets 324 through the plate. These grommets allow fiber optic cable or copper wire to be brought through the perimeter of protection into the compartment while maintaining the protective benefits.

A further level of protection may be obtained by attaching doors to the cable mounting structure. As shown in FIG. 3a, the cable mounting structure includes two doors 326. Although two doors are shown, the cable mounting structure can have any number of doors (including no doors). FIG. 3b illustrates the use of one door. The removably attached door is operable to open and close. When closed, the door covers the compartment. The doors can provide additional protection for the cable, wire and distribution components from the elements, animals and unauthorized access.

The door is attached to the cable mounting structure via a snap connection hinge 328. This hinge allows the door to be snapped on and off the cable mounting structure without the use of tools. The hinge will be discussed in more detail below.

The door includes a recessed portion 330. This recessed portion provides additional space to accommodate cable, wire and devices housed in the cable mounting structure. Additionally, the recessed portion provides additional protection for the cable within the cable mounting structure.

Figure 4:
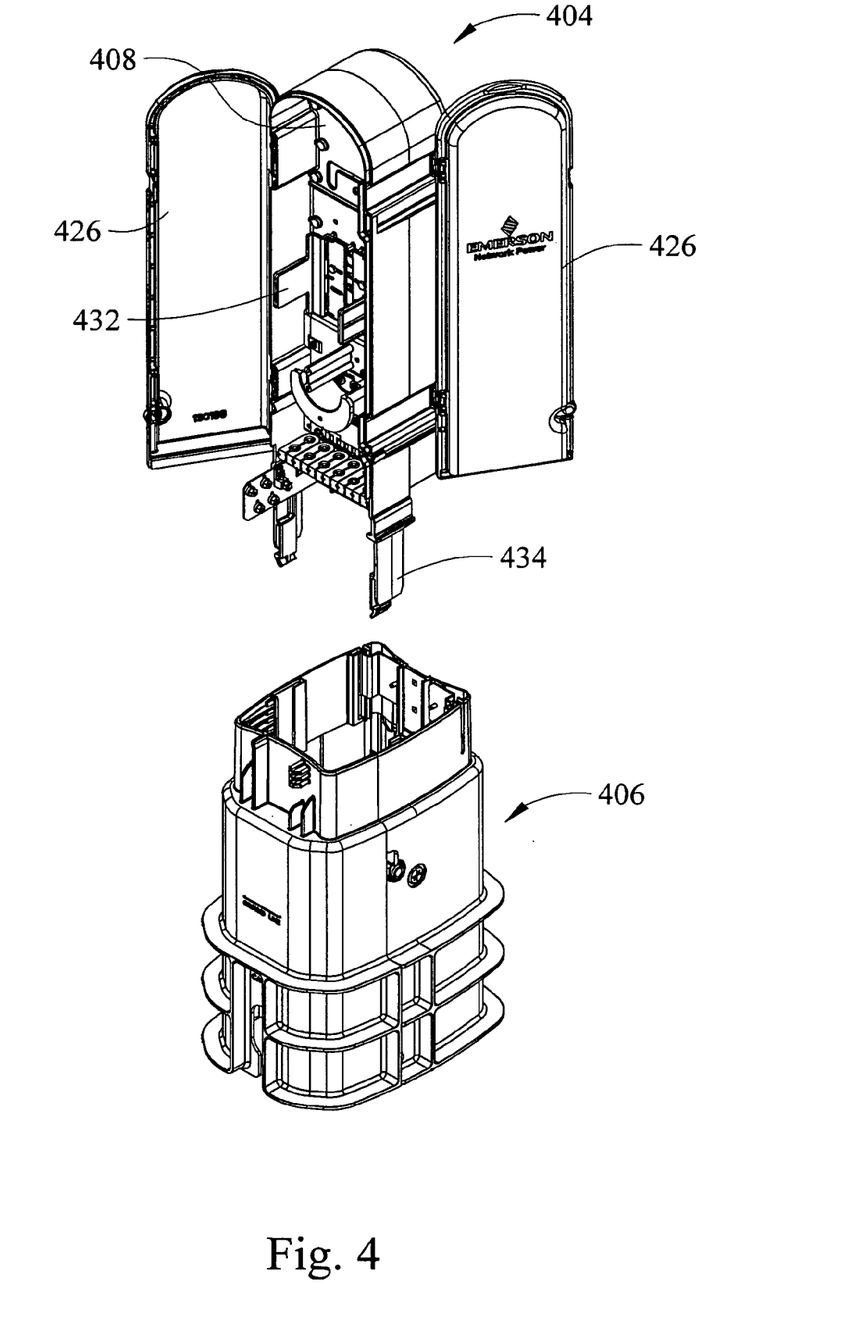
FIG. 4 is an exploded isometric view of a cable mounting structure for a telecommunications cable distribution pedestal and a base.

A cable mounting structure 404, and a base 406 according to another embodiment of the disclosure are shown in FIG. 4. The cable mounting structure has a back to back first compartment 408 and second compartment (not visible). Each compartment also has a door 426. This removably attached door is operable to open and close. When closed, the door covers the associated compartment. The first compartment in this embodiment is configured for copper distribution components. The first compartment includes a wire splice tray support bracket 432 that will be discussed further below.

Splice trays are used for making fiber cable connections. They are manufactured in various sizes and widths by numerous manufacturers. The adjustable splice tray support bracket mounts within the cable mounting structure and can be adjusted to accept and mount any of the variously sized splice trays available on the market at this time.

With reference to FIG. 4, the cable mounting structure is also configured to attach to the pedestal base without hardware. The cable mounting structure includes legs 434 that allow the cable mounting structure to mount to the pedestal base without any additional hardware. The legs fit in and removably lock in a slot in the base. The legs may be removably attached to the cable mounting structure or they may be a unitary part of the cable mounting structure. The removably attached legs may be attached by any means including screws or bolts. The unitary legs are molded as part of the cable mounting structure when the cable mounting structure is formed.

Figure 5:
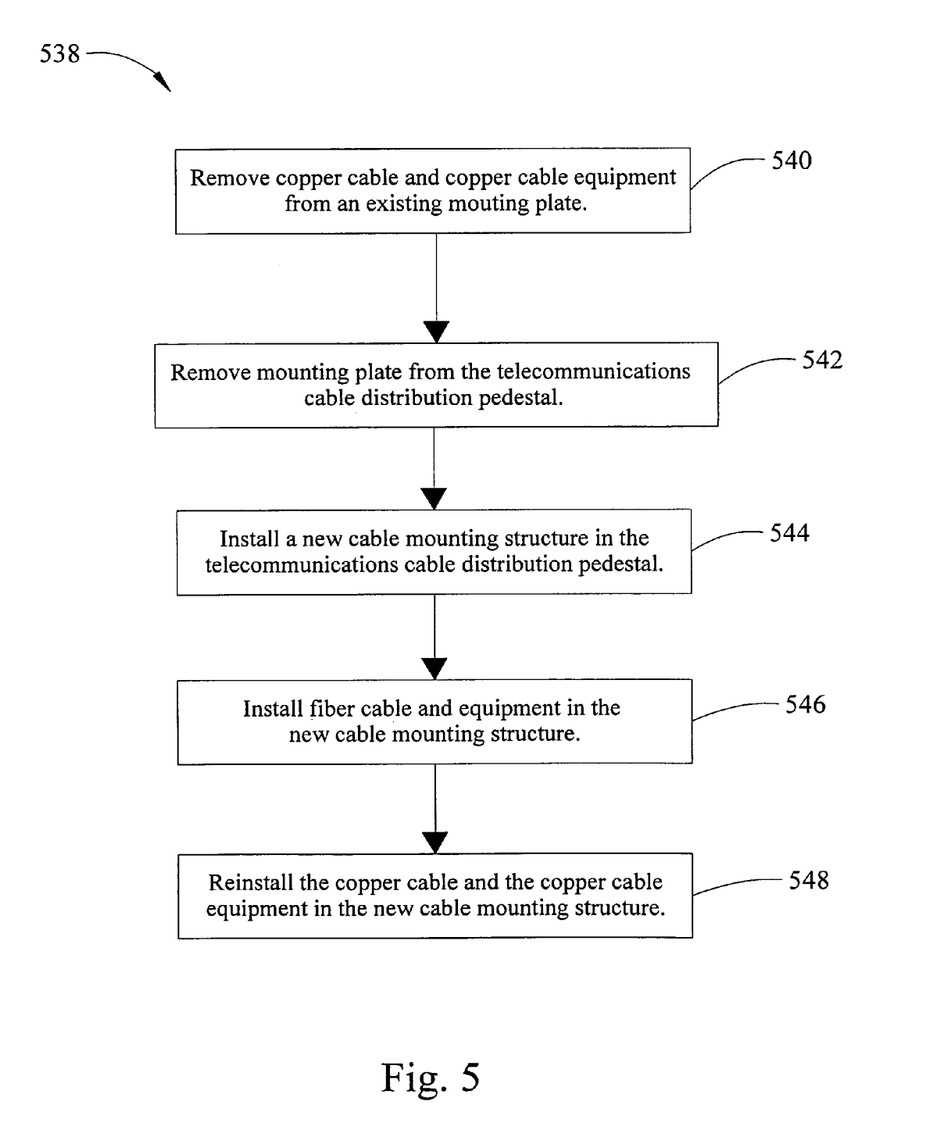
FIG. 5 is a method for field converting a cable mounting structure for a telecommunications cable distribution pedestal.

FIG. 5 illustrates a method of field converting a telecommunications cable distribution pedestal generally indicated by 538. At step 540, the copper cable and copper cable equipment are removed from an existing mounting plate. The mounting plate is then removed from the telecommunications cable distribution pedestal at step 542. A new cable mounting structure that includes a back to back first compartment and second compartment is installed in the telecommunications cable distribution pedestal at 544. At step 546, fiber cable and equipment is installed in the new cable mounting structure. The copper cable and equipment is reinstalled in the new cable mounting structure at step 548. Alternatively, fiber cable and equipment may be installed in the first compartment of the new cable mounting structure while copper cable and copper cable equipment is installed in the second compartment or fiber cable only may be installed in the cable mounting structure.

Figure 6A:
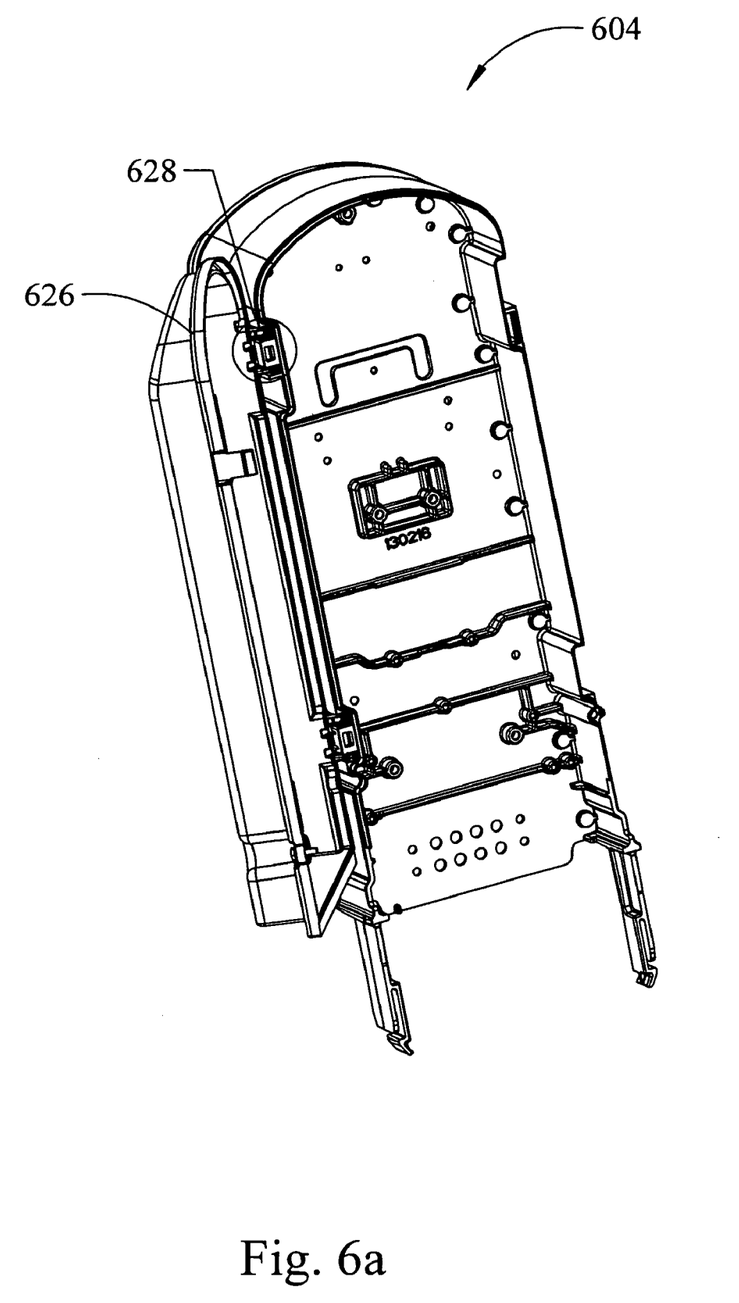
FIG. 6*a* is an isometric view of a cable mounting structure for a telecommunications cable distribution pedestal including a hinge.
Figure 6B:
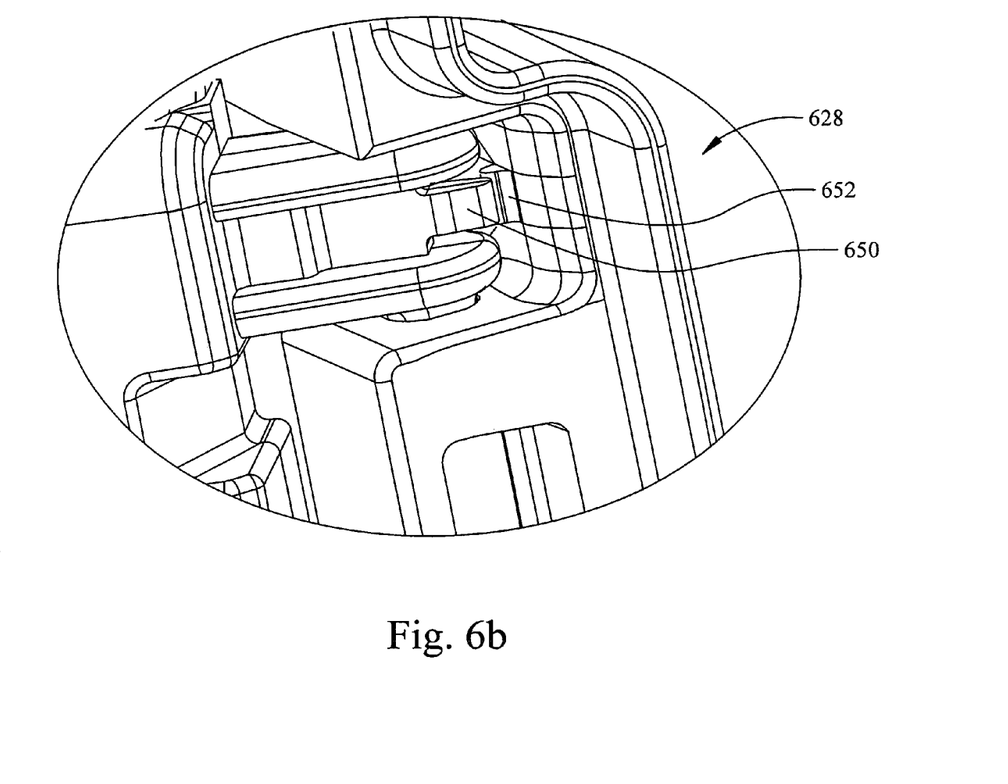
FIG. 6*b* is a close up of the hinge if FIG. 6*a*.
Figure 6C:
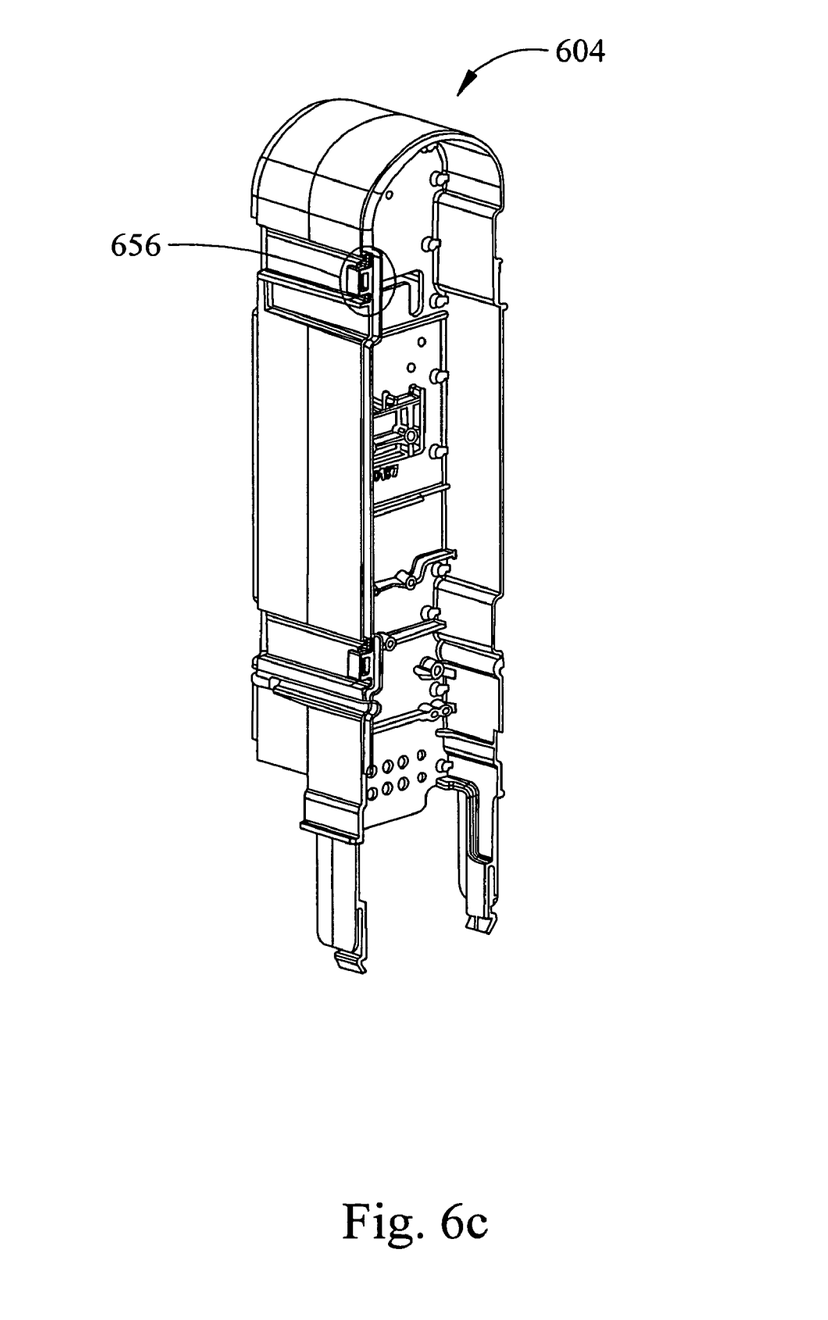
FIG. 6*c* is an isometric view of a cable mounting structure for a telecommunications cable distribution pedestal including one part of a hinge.
Figure 6D:
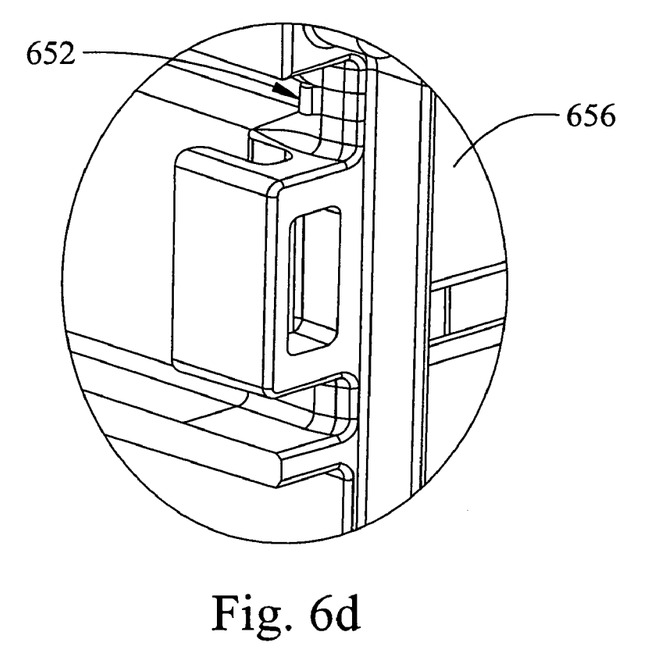
FIG. 6*d* is a close up of the portion of the hinge in FIG. 6*c*.

Referring to FIGS. 6*a* through 6*f*, according to another embodiment the cable mounting structure includes a door 626 removably attached to the cable mounting structure 604 by a hinge 628. FIG. 6*b* illustrate an enlarged view of the complete hinge. The hinge includes a flex finger 650 and a catch 652. The hinge is configured such that the hinge will travel without resistance for a first portion of its maximum travel and will then encounter resistance because of the interaction of the flex finger and the catch. This resistance will continue for a second portion of the travel of the hinge. The hinge will again travel without resistance for a third portion until it reaches its maximum travel. The resistance in the second portion will permit a door to which the hinge is attached to open and close with some force applied by a user, but will prevent the door from closing or fully opening unintentionally due to wind, gravity or other causes.

Figure 6E:
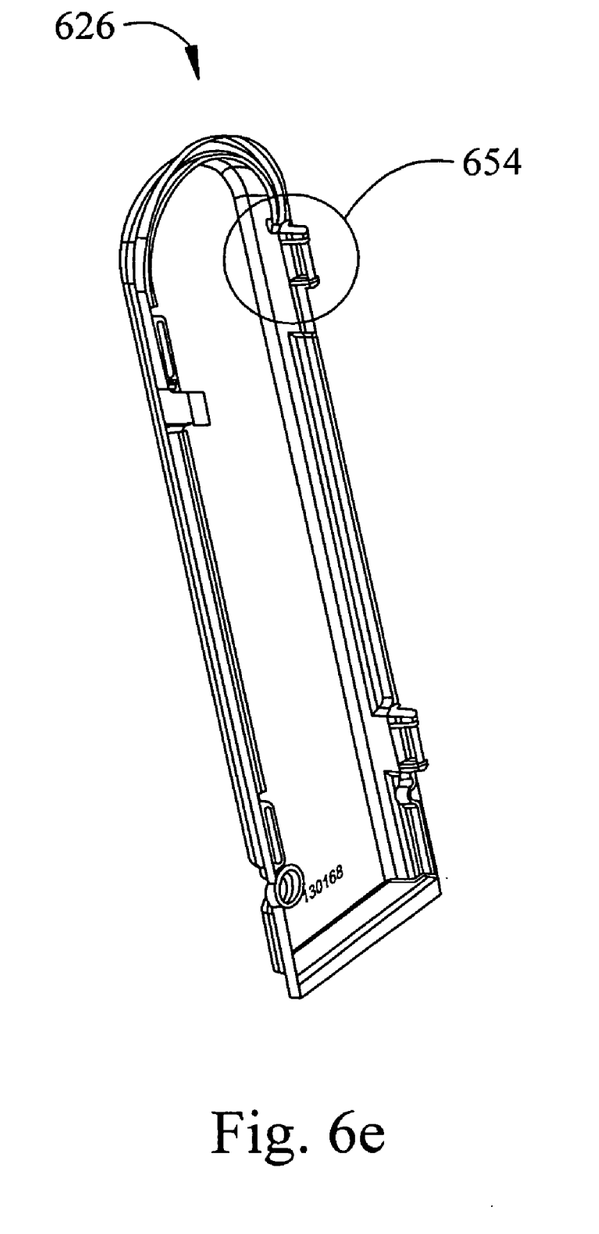
FIG. 6*e* is an isometric view of a door for a cable mounting structure including another part of a hinge.
Figure 6F:
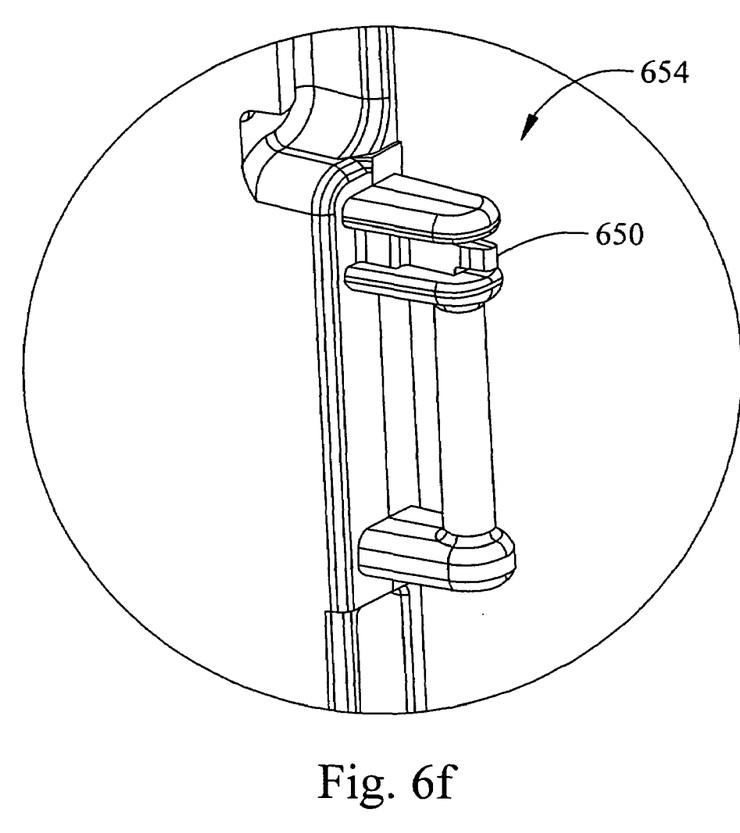
FIG. 6*f* is a close up of the portion of the hinge in FIG. 6*e*.

As shown in FIGS. 6*c*-6*f*, the hinge is a two-piece hinge consisting of a first hinge piece 654 and a second hinge piece 656. The cable mounting structure in FIG. 6*c* includes the second hinge piece 656. FIG. 62 illustrates a close-up of the second hinge piece including the catch. Although the second hinge piece and catch are shown as unitary parts of the cable mounting structure, they may also be separate parts attached to the cable mounting structure. FIG. 6*e* illustrates the first hinge piece on a door 626. A close-up of the first hinge piece is illustrated in FIG. 6*f*. The first hinge piece includes the flex finger 650. Although the first hinge piece and flex finger are shown as unitary parts of the door, they may alternatively be separate parts attached to the door. Alternatively, the flex finger may be a part of the second hinge piece and the catch may be part of the first hinge piece. The locations of the first hinge piece and the second hinge piece may also be reversed such that they are part of the cable mounting structure and the door respectively.

The first and second hinge pieces connect together to form the hinge. Connecting the pieces together to form the hinge also mounts the door to the cable mounting structure. The first hinge piece and the second hinge piece connect to each other to form the complete hinge via a snap fit. No tools are necessary to assemble the hinge or, therefore, mount the door to the cable mounting structure.

Figure 7:
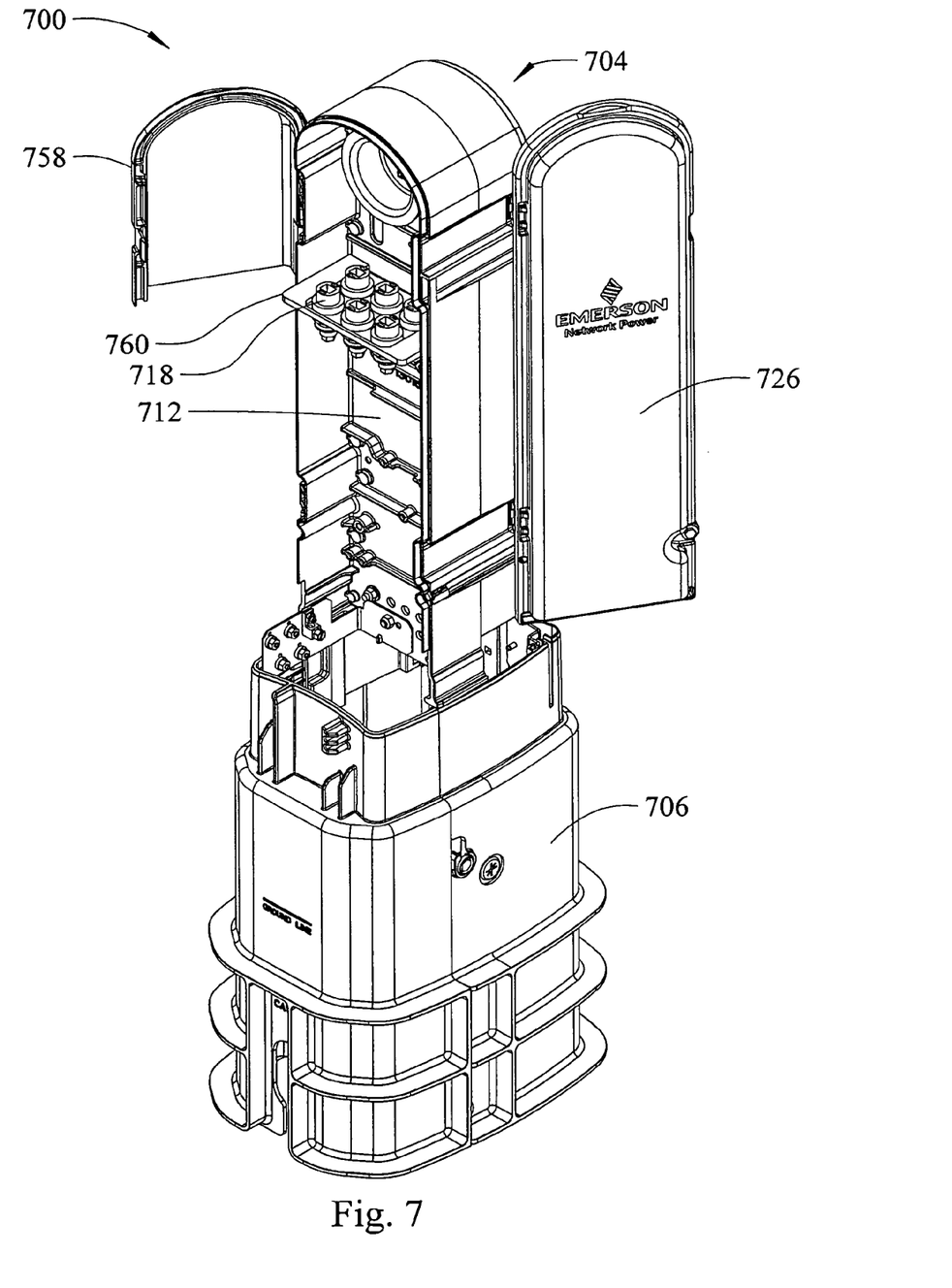
FIG. 7 is an isometric view of a cable mounting structure mounted on a mounted on a base.

An additional embodiment of telecommunications cable distribution pedestal 700 is illustrated by FIG. 7. The telecommunications cable distribution pedestal consists of a dome (not shown), a cable mounting structure 704, and a base 706. The cable mounting structure has back to back compartments and includes a door 726 removably attached to a rear compartment (not visible). The front compartment has hardened fiber optic connectors mounted to the mounting plate 712 in the front compartment. The front compartment also includes a door 758. The door 758 does not cover the entire front compartment. The door only covers the portion of the compartment at and above the base plate for the hardened fiber optic connectors. This configuration provides protection for the top side of the connectors, which is often the side in need of additional protection, while leaving free access to the bottom of the connectors and any additional distribution components mounted below them. Such a configuration is less expensive to manufacture and is less difficult for installers to work with. Although the door 758 is illustrated covering the area above one set of hardened connectors, the door 758 can be any length so long as it is less than the entire length of the compartment. Therefore the door may be sized to enclose one or more sets of hardened connectors or other distribution components while leaving additional distribution components, or unused space, uncovered and exposed.

While the present disclosure has been described with reference to certain preferred embodiments, it is to be understood that the present disclosure is not limited to such specific embodiments. Specifically, the various elements described in this disclosure may be combined, removed, or included in different combinations without departing from the scope of this disclosure. Other modifications and additions may be made without departing from the spirit and scope of this disclosure.

What is claimed is:

1. A hinge for a telecommunications cable distribution pedestal, the hinge comprising a first hinge piece and a second hinge piece, one of the first hinge piece and the second hinge piece includes a flex finger and the other of the first hinge piece and the second hinge piece includes a catch, the hinge configured to travel a first portion of its maximum travel without resistance, to travel a second portion of its maximum travel with resistance provided by interaction of the flex finger and the catch, and to travel a third portion of its maximum travel without resistance.

2. The hinge of claim 1 wherein the first hinge piece is attached to a door and the second hinge piece is attached to a cable mounting structure.

3. The hinge of claim 2 wherein the first hinge piece and the second hinge piece are unitary parts of the door and the cable mounting structure respectively.

4. The hinge of claim 1 wherein the first hinge piece connects to the second hinge piece via a snap-fit.

5. The hinge of claim 1 wherein the hinge is configured to travel between an open position and a closed position and the second portion is between the open position and closed position.

6. A cable mounting structure for a telecommunications cable distribution pedestal, the cable mounting structure comprising a first compartment having a plurality of fastener standoffs configured to receive distribution components, a second compartment having a plurality of fastener standoffs configured to receive distribution components and a first door, wherein the first compartment and the second compartment are back-to-back compartments, the first door is operable to open and close, and the first door covers less than all of the second compartment when closed.

7. The cable mounting structure of claim 6 wherein the first door attaches to the cable mounting structure via a snap connection hinge.

8. The cable mounting structure of claim 6 wherein the first door includes a recessed portion for accommodating and protecting cable.

9. The cable mounting structure of claim 6 wherein the first compartment includes copper distribution components mounted therein, the second compartment includes fiber distribution components mounted therein.

10. The cable mounting structure of claim 9 further comprising a second door, the second door operable to open and close, and the second door covering the first compartment when closed.

* * * * *